Oct. 26, 1954  S. OLDBERG  2,692,615

FLOW CONTROL MECHANISM

Filed Aug. 25, 1950

INVENTOR.
SIDNEY OLDBERG
BY
ATTORNEYS

Patented Oct. 26, 1954

2,692,615

UNITED STATES PATENT OFFICE 2,692,615

FLOW CONTROL MECHANISM

Sidney Oldberg, Birmingham, Mich., assignor to Eaton Manufacturing Company, Cleveland, Ohio, a corporation of Ohio Application August 25, 1950, Serial No. 181,346

11 Claims. (Cl. 137—625.46)

This invention relates to control mechanism and more particularly to a combination throttle and by-pass valve controlled mechanism.

Broadly, the invention comprehends the provision of a valve mechanism employing a single valve element that is positioned in specific arrangement to interconnecting throttle and by-pass passageways effective to control the throttle passageway and to seal off the by-pass passageway at full throttle position thereof. The valve of the butterfly type is adapted to have a portion of one flat face thereof movable into sealing engagement across the full area of the by-pass passage in the sealing off thereof.

Although numerous by-pass and throttle valve arrangements have been devised as applied to supercharger apparatus or like apparatus requiring similar operational control, none have been known until the present that can as effectively and positively, through the utilization of a single butterfly valve, seal off the by-pass passageway of an intercommunicated through and by-pass passageway arrangement as well as effectively throttle the through passageway to the extent desired without using precise manufacturing means and cumbersome assembly procedures.

Among the objects of the invention is the provision of a single butterfly valve and specific intercommunicated through and by-pass passageway arrangement wherein the valve is cooperatively positioned relative thereto and pivoted medially about an axis lying in a flat surface thereof that is simple of construction and operation; that is, effective to throttle the through passageway and positively seal off the by-pass passageways intercommunicated with the through passageway; that provides for the sealing of the valve in the surface of one flat face thereof upon the full periphery of the by-pass passageway; and that permits the opening of the valve in wide open throttle position through the provision of unbalanced force or torque acting upon the valve through the by-pass passageway.

Figure 1:
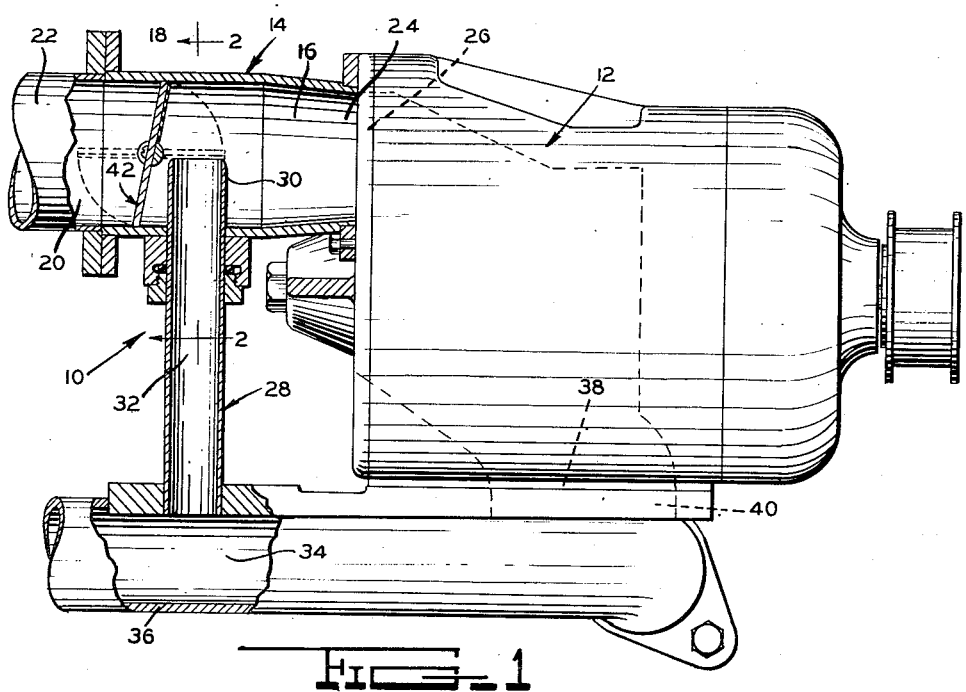
Figures 2, 3:
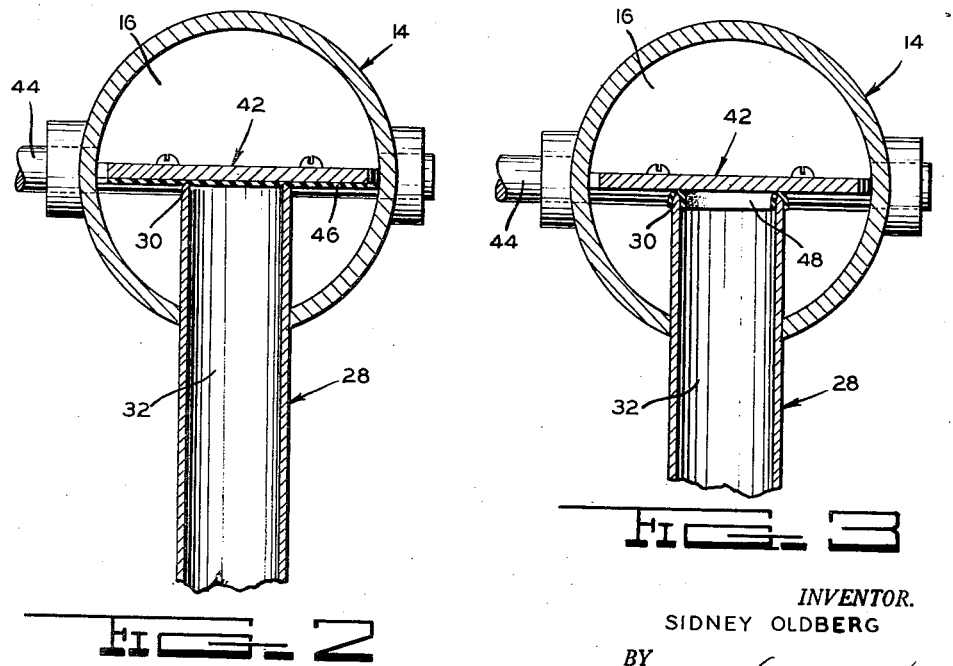

Other objects and advantages of the invention will appear from the following description taken in connection with the drawings, forming a part of the specification; and in which, Fig. 1 is a cross-sectionalized view of a throttle and by-pass valve controlled mechanism as applied to a supercharger;

Fig. 2 is a vertical sectional view taken along lines 2—2 of Fig. 1 with the plate valve thereof moved to dotted line position of Fig. 1; and Fig. 3 is a view similar to Fig. 2 with the incorporation therein of a modified sealing member between the valve and by-pass conduit.

Similar reference characters indicate corresponding parts throughout the several views of the drawings.

This invention is directed at the provision of a suitable yet simple by-pass system for use with superchargers and the like wherein a simple butterfly of preferably elliptical shape is utilized effective to afford a fairly tight air seal both in the operation as a throttle valve controlling inflowing air being delivered through a conduit direct to apparatus, such as a supercharger, and as a by-pass seal off valve over the end of a by-pass conduit having intercommunication with the direct airflow conduit for the supercharger. The valve is so arranged relative to the conduits and its peripheral shape so as to be pivotal about an axis permitting of a fairly tight air seal in closed throttle position with the periphery of said elliptical shape engaging an internal peripheral cylindrical wall of the direct airflow conduit and a tight air seal over the open communication end of the by-pass conduit with the direct air flow conduit. For the purpose of accommodating the sealing off of the by-pass conduit, said conduit extends through the wall and into the open passageway of the direct airflow conduit and for practical purposes terminates in a plane passing substantially through the axis of the direct airflow conduit such that as the valve is opened to full open throttle position a flat face or surface of the valve closes off completely the open end of the by-pass conduit. As an additional seal between the valve and by-pass conduit either the surface of the valve engaging said by-pass conduit or the peripheral lip may be provided with a flexible or like material thereby effecting a positive seating and sealing surface therebetween. By so arranging the valve for sealing engagement with the by-pass conduit an unbalanced force or torque tending to open the valve in the wide or full open throttle position is provided, thus in the case of superchargers permitting the use of boost limit and governor controls if desired.

Referring to the drawings for more specific details of the invention 10 represents generally a combination throttle and by-pass valve controlled system as specifically applied to a supercharger 12 arranged intermediate an engine carburetor, not shown, and the supercharger.

The combination throttle and by-pass system 10 includes a direct or through airflow conduit 14 having a passageway 16 therethrough of preferably circular cross section adapted for communication at one end 18 with the outlet passage 20 of carburetor member 22, and at its opposite end 24 with an inlet port 26 of the supercharger. The conduit 14 is securely mounted at opposite ends respectively upon the carburetor member and supercharger.

A by-pass conduit 28 of tubular form, forming a part of the combination system 10, extends through the wall of conduit 14 at right angles to the axis thereof intermediate the open ends thereof and juts into passageway 16 therethrough to a distance such that the end extremity 30 thereof, which is preferably at right angles to the length, lies substantially in a plane passing through the axis of the conduit 14, the purpose of which will hereinafter appear. The conduit 28 has a passageway 32 therethrough communicating at one end with passageway 16 of conduit 14 and at its other end with a passageway 34 of an engine manifold conduit 36 to which the supercharger 12 exhausts by way of port 38 communicating with opening 40 into the manifold. The conduit 28 is rigidly secured between the manifold 36 and conduit 14.

With the combined arrangement of the conduit 14, conduit 28 and manifold 36 with one another and the association of the conduit 14 and manifold 36 with the respective inlet and discharge ports of the supercharger, the conduit 28 can permit of the unloading of the supercharger at part throttle by the by-passing of propelled air from the manifold as delivered thereto from the supercharger back to the inlet of the supercharger by way of the intercommunicated passageways 16 and 32 of the respective direct and by-pass conduits.

A valve 42 of the butterfly type is arranged pivotally in passageway 16 of conduit 14 with its pivot axis perpendicular to the axis of the conduit and is preferably elliptical in peripheral shape so as to be properly engageable with the inner wall of the conduit for the providing of a fairly tight air seal therewith. A pivot shaft 44 for the valve is secured substantially in the surface of the valve which is of a flat plate design and has its ends journalled in the conduit wall for movement to full line position as shown by Fig. 1 of the drawings or to dotted line position approximately 90° from full line position to seal off the open end of the by-pass conduit which position is considered full or wide open throttle position.

It will be noted in viewing Figs. 2 and 3 that provision of sealing means in the form of a flexible material 46 is secured as shown by Fig. 2 upon a flat face of the valve for engagement with the end 30 of conduit 28 around the periphery of the passageway therein and as shown by Fig. 3 an annular U-shaped collar 48 of flexible material is secured at the end of conduit 28 adapted to be engaged by the flat face of the valve which in this case is not required to have a sealing material as in Fig. 2.

The arrangement of the valve as shown to accomplish the positive sealing off of the by-pass conduit at wide open throttle is advantageous further from the standpoint that it provides for unbalanced forces or torque by way of passageway 32 in the by-pass conduit tending to open the valve thereby permitting the use of boost limit and governor controls for the supercharger, or like apparatus, if desired.

Although the combination throttle and by-pass system as herein disclosed is applied to a supercharger and is specific in form, other similar applications thereto can be made with like effect and slight departures can be made without materially changing the principle of operation and construction or arrangement of elements basically included in the system. The invention is accordingly to be limited only as evidenced by the appended claims.

What I claim is:

1. A combination throttle and by-pass system comprising a conduit adapted to have one open end interconnected to the inlet of a mechanism to be supplied therefrom, a second conduit of lesser diameter than the first conduit having one open end extending through the wall of the first conduit into communication with the passageway therethrough substantially centrally of the passageway and adapted to have its other open end interconnected to the outlet of the mechanism to which the first conduit is interconnected, and a butterfly valve pivotally mounted on the first conduit along an axis at right angles to the axis of said first conduit, which axis intersects the axis of said first conduit and being centrally disposed and movable in the passageway thereof to control fluid flow therethrough having a part thereof engageable upon the open end of the second conduit in communication with the passageway in the first conduit, said second conduit having an opening of a diameter less than one-half of the diameter of the valve, and said valve, when the part thereof is in engagement in the second conduit being in a position of maximum open control of the first conduit.

2. A system according to claim 1 wherein the passageway in the first conduit is substantially circular in cross section.

3. A system according to claim 1 wherein the valve is substantially a flat plate.

4. A system according to claim 2 wherein the valve is substantially a flat plate with the pivot axis therefor lying in the surface thereof and intercepting substantially the center thereof and the axis of the conduit.

5. A system according to claim 4 wherein the valve has a substantially elliptical shape.

6. A system according to claim 1 wherein sealing means are interposed between the portion of the valve and the open end of the second conduit engageable with one another.

7. A system according to claim 6 wherein the sealing means is mounted on a face of the valve engaging the open end of the second conduit.

8. A system according to claim 6 wherein the sealing means is in the form of a substantially U-shaped section annular ring mounted upon the axial extremity of the open end of the second conduit with which the valve is engageable.

9. A system according to claim 1 wherein the axis of the conduits lie substantially perpendicular to one another.

10. A combination throttle and by-pass system comprising a conduit adapted to have one open end interconnected to the inlet of a mechanism to be supplied therefrom, a second conduit extending at right angles through the walls of said first conduit and terminating in an open end in communication with the passageway in said first conduit in a zone adjacent the axis of said first conduit, a butterfly valve disposed entirely within the first conduit and pivotal along an axis at right angles to the axis of said first conduit with said axis of the valve intersecting the axis of said first conduit, said axis of said valve being disposed axially to one side of the second conduit such that upon pivotal action of the valve to full open position relative to said first conduit a one-half portion of the valve arranged on one side of the axis thereof engages the open end of said second conduit to close off communication thereof with the passageway in the first conduit.

11. A system according to claim 10 wherein the open end of the said second conduit lies in a plane perpendicular to a plane lying in the axis of the valve and said first conduit and at right angles to the axis of said second conduit.

References Cited in the file of this patent

UNITED STATES PATENTS

| Number | Name | Date |
|---|---|---|
| 362,610 | Collins | May 10, 1887 |
| 373,848 | Pearsall | Nov. 29, 1887 |
| 794,053 | Sommer | July 4, 1905 |
| 808,397 | Meakin | Dec. 26, 1905 |
| 922,145 | Howarth | May 18, 1909 |
| 1,195,715 | Paynter | Aug. 22, 1916 |